United States Patent
Heuer et al.

(10) Patent No.: US 7,332,560 B2
(45) Date of Patent: Feb. 19, 2008

(54) THERMOPLASTIC MOLDING COMPOSITIONS HAVING REDUCED WATER ABSORPTION

(75) Inventors: Helmut-Werner Heuer, Krefeld (DE); Rolf Wehrmann, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 141 days.

(21) Appl. No.: 11/266,960

(22) Filed: Nov. 4, 2005

(65) Prior Publication Data

US 2006/0100389 A1 May 11, 2006

(30) Foreign Application Priority Data

Nov. 11, 2004 (DE) .................. 10 2004 054 498

(51) Int. Cl.
*C08F 64/00* (2006.01)
(52) U.S. Cl. .................. 528/196; 264/176.1; 264/219; 359/109; 359/642; 428/411.1; 428/412; 528/198
(58) Field of Classification Search ............ 264/176.1, 264/219; 359/109, 642; 428/411.1, 412; 528/196, 198
See application file for complete search history.

(56) References Cited

U.S. PATENT DOCUMENTS

| 3,069,386 | A | * | 12/1962 | Barclay Jr. .................. 528/174 |
| 4,374,974 | A | | 2/1983 | Hay ........................... 528/219 |
| 6,391,418 | B1 | | 5/2002 | Ueda et al. ................. 428/64.7 |
| 2005/0020802 | A1 | | 1/2005 | Heuer et al. ................. 528/129 |
| 2005/0031855 | A1 | | 2/2005 | Heuer et al. ................. 428/332 |
| 2005/0049389 | A1 | | 3/2005 | Heuer et al. ................. 528/422 |
| 2005/0090593 | A1 | | 4/2005 | Heuer et al. ................. 524/366 |

OTHER PUBLICATIONS

Technical Digest of Joint ISOM/ODS 2002, Mitsubishi Engineering Plastics Corp., Jul. 8, 2002, p. 33-35, Masaya Ueda, "Plastic Substrate with High Performance Using A New Polycarbonate with addition of an Antiplasticizer (2)".

* cited by examiner

*Primary Examiner*—Terressa Boykin
(74) *Attorney, Agent, or Firm*—Aron Preis

(57) ABSTRACT

A thermoplastic molding composition comprising polycarbonate and at least one (co)polyformal is disclosed. Characterized by its low water absorption the composition is particularly suitable for producing molded articles, especially optical data carriers, such as compact disks, video disks, digital versatile disks and optical data carriers that are writable and erasable once or repeatedly.

17 Claims, No Drawings

THERMOPLASTIC MOLDING COMPOSITIONS HAVING REDUCED WATER ABSORPTION

FIELD OF THE INVENTION

The invention relates to thermoplastic molding compositions and in particular to composition having reduced water absorption suitable for articles producing optical data carriers articles.

BACKGROUND OF THE INVENTION

Because of their particular combination of properties such as transparency, dimensional stability under heat and dimensional stability, polycarbonates in general are used as materials for the injection molding, or injection stamping, of optical data carriers. In order to improve their processability, which generally takes place at temperatures in the range of from 300° C. to 400° C., additives such as mold release agents and stabilizers are generally added to the polycarbonate.

Aromatic polycarbonates based on bisphenol A are used especially for the production of optical data carriers. However, they can absorb up to 0.34 wt. % water, which can have an adverse effect on the dimensional stability of the data carriers. Improved dimensional stability is important, however, especially in the use of blue or blue-green lasers.

U.S. Pat. No. 6,391,418 describes substrates for data carrier media comprising a biphenyl derivative as additive for increasing the dimensional stability (low shrinkage).

In M. Ueda, Mitsubishi Engineering Plastics Corp., Technical Digest of Joint ISOM/ODS 2002 Waikoloa Hi., Aug. 7, 2002, page 33-35, the addition of small amounts of m-terphenyl to bisphenol A polycarbonate is described, which leads to a reduction in the water absorption. However, such biphenyl derivatives have the disadvantage that they are highly conjugated aromatic π-systems, which already absorb in the blue or blue-green spectral range. This is undesirable in the case of storage technologies that work in this wavelength range. Moreover, terphenyls are relatively rigid molecules, which have a negative effect on the mechanical properties in the mixture with polycarbonate.

Also relevant in the present context are the disclosures of:
(i) branched polyformals and copolyformals, their preparation and use reported in German Patent Application DE10339357 (corresponding to US 2005049389 A1) and
(ii) aromatic formals as additives for lowering the water uptake of polycarbonate, reported in German Patent Application 10338909(corresponding to WO2005021629) and
(iii) polyformals and copolyformals with reduced water absorption, production and use thereof reported in German Patent Application 10333928 (corresponding to US2005020802) and (iv) polyformals as a coextrusion protective layer on polycarbonate reported in German Patent Application 10333927 (corresponding to US2005031855)

Accordingly, the possibilities described in the above mentioned prior art do not give satisfactory results in every respect. However, there is no indication in the prior art either that polyformals might be suitable as a blend partner for reducing water absorption.

The object was, therefore, to provide thermoplastic molding compositions which comprise polycarbonate having reduced water absorption and which accordingly exhibit better dimensional stability. In particular, the new disk formats with a higher storage capacity and optionally a lower disk thickness, such as, for example, Digital Versatile Disks (DVDs), require higher heat stability in comparison with CDs. The occurrence of material damage during processing to molded articles and the formation of a coating in the tool become more critical.

With the molding compositions according to the invention this object is, surprisingly, achieved by an improved quality of the data storage means and improved processability of the material by the injection molding, or injection stamping, process and a reduced water absorption and accordingly, ultimately, improved dimensional stability.

SUMMARY OF THE INVENTION

A thermoplastic molding composition comprising polycarbonate and at least one (co)polyformal is disclosed. Characterized by its low water absorption the composition is particularly suitable for producing molded articles, especially optical data carriers, such as compact disks, video disks, digital versatile disks and optical data carriers that are writable and erasable once or repeatedly.

DETAILED DESCRIPTION OF THE INVENTION

The present invention accordingly provides thermoplastic molding compositions comprising at least one polycarbonate and at least one polyformal as blend partner for reducing water absorption. These polycarbonate/polyformal blends accordingly result in improved dimensional stability of the data carriers.

The polyformals according to the invention as blend partner are based on the general formula (1) as repeating monomeric unit

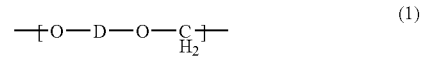

wherein
each D independently of the other represents an aromatic radical having from 6 to 40 carbon atoms, preferably from 6 to 35 carbon atoms, especially from 6 to 30 carbon atoms, said radical optionally containing hetero atoms, and is optionally substituted by $C_1$-$C_{12}$-alkyl, preferably $C_1$-$C_{10}$-alkyl, particularly preferably $C_1$-$C_8$-alkyl, and/or by halogen, preferably fluorine or chlorine, and is further optionally containing aliphatic or cycloaliphatic radicals.

D in formula (1) preferably represents a radical of formula (1a)

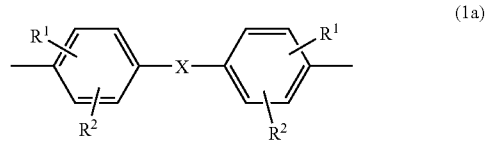

wherein
$R^1$ and $R^2$ independently of one another represent H, $C_1$-$C_{18}$-alkyl, $C_1$-$C_{18}$-alkoxy, halogen, such as Cl or Br, or in each case optionally substituted aryl or aralkyl, preferably H or $C_1$-$C_{12}$-alkyl, particularly preferably H or $C_1$-$C_8$-alkyl and very particularly preferably H or methyl, and X represents a single bond, —SO$_2$—, —CO—, —O—, —S—, C$_1$- to C$_6$-alkylene, C$_2$- to C$_5$-alkylidene or C$_5$- to C$_6$-cycloalkylidene, which may be substituted by C$_1$- to C$_6$-alkyl, preferably methyl or ethyl, or X represents C$_6$- to C$_{12}$-arylene which may optionally be condensed with further aromatic rings containing hetero atoms.

X preferably represents a single bond, C$_1$- to C$_5$-alkylene, C$_2$- to C$_5$-alkylidene, C$_5$- to C$_6$-cycloalkylidene, —O—, —SO—, —CO—, —S—, —SO$_2$— or a radical of formula (1b)

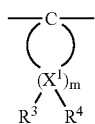

(1b)

wherein

R$^3$ and R$^4$ individually for each X$^1$ represent, independently of one another, hydrogen or C$_1$- to C$_6$-alkyl, preferably hydrogen, methyl or ethyl, and X$^1$ represents carbon and m represents an integer from 4 to 7, preferably 4 or 5, with the proviso that on at least one atom X$^1$R$^3$ and R$^4$ are simultaneously alkyl.

D is preferably derived from the following diphenols: 4,4'-dihydroxybiphenyl (DOD), 2,2-bis-(4-hydroxyphenyl)-propane (bisphenol A), 1,1-bis-(4-hydroxyphenyl)-3,3,5-trimethylcyclohexane (bisphenol TMC), 1,1-bis-(4-hydroxyphenyl)-cyclohexane, 2,4-bis-(4-hydroxyphenyl)-2-methylbutane, 1,1-bis-(4-hydroxyphenyl)-1-phenylethane, 1,3-bis-[2-(4-hydroxyphenyl)-2-propyl]-benzene (bisphenol M), 1,3-bis[2-(4-hydroxyphenyl)-2-propyl]-benzene (bisphenol M), 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 2,2-bis-(3,5-dichloro-4-hydroxyphenyl)-propane and 2,2-bis-(3,5-dibromo-4-hydroxyphenyl)-propane.

D is derived particularly preferably from the following diphenols: 2,2-bis-(4-hydroxyphenyl)-propane (bisphenol A), 4,4'-dihydroxybiphenyl (DOD), 1,3-bis[2-(4-hydroxyphenyl)-2-propyl]-benzene (bisphenol M), 2,2-bis-(3,5-dimethyl-4-hydroxyphenyl)-propane, 1,1-bis-(4-hydroxyphenyl)-1-phenylethane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC).

D is derived very particularly preferably from 2,2-bis-(4-hydroxyphenyl)-propane (bisphenol A), 4,4'-dihydroxybiphenyl (DOD), 1,3-bis[2-(4-hydroxyphenyl)-2-propyl]-benzene (bisphenol M) and 1,1-bis-(4-hydroxyphenyl)-3,3,5-trimethyl-cyclohexane (bisphenol TMC).

D very particularly preferably represents a radical of formula (1c) and/or (1d) and/or (1e)

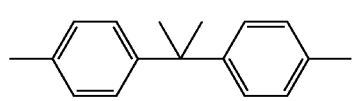

(1c)

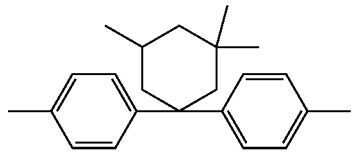

(1d)

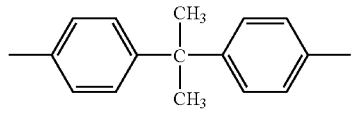

(1e)

Special preference is given to 2,2-bis-(4-hydroxyphenyl)-propane (bisphenol A) and 1,1-bis-(4-hydroxyphenyl)-3,3,5-trimethylcyclohexane (bisphenol TMC).

The diphenols may be used either alone or in a mixture with one another. Within the scope of the present invention, therefore, polyformals are to be understood as being both homo- and co-polyformals as well as cyclic homo- and co-oligoformals. Copolyformals generally contain at least up to 50 mol. %, preferably up to 45 mol. %, particularly preferably up to 40 mol. %, especially up to 30 mol. % (based on the sum of the moles of diphenols used) of at least one further diphenol selected from formula (1). The diphenols are known in the literature or may be prepared by processes known in the literature (see e.g. H. J. Busch et al., Ullmann's Encyclopedia of Industrial Chemistry, VCH, New York 1991, 5th Ed., Vol. 19, p. 348) incorporated herein by reference.

The polyformals according to the invention have molecular weights (weight average) of from 600 to 1,000,000 g/mol., preferably from 600 to 500,000 g/mol., particularly preferably from 1000 to 250,000 g/mol., especially from 10,000 to 80,000 g/mol., determined by gel permeation chromatography (GPC) calibrated against polycarbonate with bisphenol A as the diphenol unit.

The preparation of polyformals is described in DE 10 333 928 A. The polyformals may be prepared by reacting diphenols and chain terminators in a homogeneous solution of methylene chloride or alpha,alpha-dichlorotoluene and a suitable high-boiling solvent, such as, for example, N-methylpyrrolidone (NMP), dimethylformamide (DMF), dimethyl sulfoxide (DMSO), N-methylcaprolactam (NMC), chlorobenzene, dichlorobenzene, trichlorobenzene or tetrahydrofuran (THF), in the presence of a base, preferably sodium hydroxide or potassium hydroxide, at temperatures of from 30 to 160° C. Preferred high-boiling solvents are NMP, DMF, DMSO and NMC, particularly preferably NMP, NMC, DMSO and very particularly preferably NMP and NMC. The reaction may also be carried out in several steps. The separation of the cyclic impurities which may be necessary is carried out, after washing the organic phase until neutral, by a precipitation process in or by a fractionated kneading process of the crude product with a solvent that dissolves the cyclic compounds, for example acetone. The cyclic impurities thereby dissolve almost completely in the solvent and may be separated off almost completely by kneading and exchanging the solvent in portions. By the use of, for example, about 10 liters of acetone, which is added in, for example, 5 portions to an amount of polyformal of about 6 kg, it is possible to achieve a cyclic compound content after kneading of markedly less than 1%.

Cyclic polyformals may also be separated off by a precipitation process in suitable solvents that act as nonsolvents for the desired polymer and as solvents for the undesired cyclic compounds. Such solvents are preferably alcohols or ketones.

The second reactant is, for example, methylene chloride or alpha,alpha-dichlorotoluene.

The reaction temperature is from 30° C. to 160° C., preferably from 40° C. to 100° C., particularly preferably from 50° C. to 80° C. and very particularly preferably from 60° C. to 80° C.

The compositions according to the invention generally contain the polyformals in an amount of from 0.1 to 30 wt. %, preferably from 1 to 30 wt. %, particularly preferably from 2 to 30 wt. %, very particularly preferably from 5 to 30 wt. %, based on the composition of polycarbonate and polyformal.

Embodiments that make use of the parameters, compounds, definitions and explanations mentioned under preferred, particularly preferred or very particularly preferred are preferred, particularly preferred or very particularly preferred.

The definitions, parameters, compounds and explanations mentioned generally in the description or within scopes of preference may, however, also be combined with one another as desired, that is to say between the particular ranges and scopes of preference.

The invention relates further to the use of such molding compositions in the production of optical data carriers, such as, for example, Compact Disks, Video Disks, Digital Versatile Disks and further optical data carriers that are writable and erasable once or repeatedly, as well as the optical data carriers themselves that may be produced from the inventive polymer mixtures.

The composition according to the invention may also be used for other traditional polycarbonate applications, including those applications that require a polycarbonate having a higher molecular weight. The applications may be transparent or opaque, such as, for example: food and drinks packaging, optical lenses and prisms, lenses for illumination purposes, vehicle headlamp lenses, glazing for construction and motor vehicles, glazing of other kinds, such as for greenhouses, so-called twin-wall sheets or hollow-chamber sheets. Other examples of applications are profiles, films, casing parts of any kind, e.g. for medical devices, domestic appliances such as juice extractors, coffee machines, mixers; for office equipment such as computers, monitors, printers, copiers; for plates, tubes, conduits for electrical installations, windows, doors and profiles for the construction sector, interior fittings and exterior applications; in the field of electrical engineering, for example for switches and sockets. The molded articles according to the invention may also be used for interior fittings and components for railway vehicles, ships, aircraft, buses and other motor vehicles, as well as for bodywork parts for motor vehicles.

Thermoplastic molding compositions within the scope of the present invention contain predominantly aromatic polycarbonates. Polycarbonates are understood as being both homopolycarbonates and copolycarbonates; the polycarbonates may, in a known manner, be linear or branched. They have a weight-average molecular weight, determined by gel permeation chromatography (calibrated against polycarbonate with bisphenol A as the diphenol unit), of from 5000 to 80,000, preferably from 10,000 to 40,000. The molecular weight is particularly preferably from 15,000 to 35,000, especially from 15,000 to 22,000.

The preparation of such polycarbonates is carried out in a known manner from diphenols, carbonic acid derivatives, optionally chain terminators and optionally branching agents.

The preparation of polycarbonates is generally known, for example Schnell, "Chemistry and Physics of Polycarbonates", Polymer Reviews, Volume 9, Interscience Publishers, New York, London, Sydney 1964, D. Freitag, U. Grigo, P. R. Müller, H. Nouvertne', BAYER AG, "Polycarbonates" in Encyclopedia of Polymer Science and Engineering, Volume 11, Second Edition, 1988, pages 648-718 and Dres. U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

There are suitable as the diphenol unit for the polycarbonates generally the diphenols described above as formula (1).

Suitable aromatic dihydroxy compounds for the preparation of the polycarbonates are, for example, hydroquinone, resorcinol, dihydroxydiphenyls, bis-(hydroxyphenyl)-alkanes, bis(hydroxyphenyl)-cycloalkanes, bis-(hydroxyphenyl) sulfides, bis-(hydroxyphenyl) ethers, bis-(hydroxyphenyl) ketones, bis-(hydroxyphenyl)-sulfones, bis-(hydroxyphenyl) sulfoxides, α,α'-bis-(hydroxyphenyl)-diisopropylbenzenes and their compounds alkylated and halogenated in the ring.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxy-phenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,4-bis-[2-(4-hydroxyphenyl)-2-propyl]benzene, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-3,3,5-trimethylcyclohexane and 1,3-bis-[2-(4-hydroxyphenyl)-2-propyl]benzene.

Particularly preferred diphenols are 2,2-bis-(4-hydroxyphenyl)-propane (BPA), 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,3-bis-[2-(4-hydroxyphenyl)-2-propyl]benzene (BPM), 1,1-bis-(4-hydroxyphenyl)-cyclohexane and 1,1-bis-(4-hydroxyphenyl)-3,3,5-trimethylcyclohexane (TMC).

These and further suitable diphenols are described, for example, in U.S. Pat. Nos. 3,028,635, 2,999,835, 3,148,172, 2,991,273, 3,271,367, 4,982,014 and 2,999,846, in DE-A 1 570 703, 2 063 050, 2 036 052, 2 211 956 and 3 832 396, French patent specification 1 561 518, in the monograph "H. Schnell, Chemistry and Physics of Polycarbonates, Interscience Publishers, New York 1964" and in JP-A 62039/1986, 62040/1986 and 105550/1986 all incorporated herein by reference.

The diphenols may be used either on their own or in a mixture with one another: Within the scope of the present invention, therefore, polycarbonates are to be understood as being both homopolycarbonates and copolycarbonates. Copolycarbonates generally contain at least up to 50 mol. %, preferably up to 45 mol. %, particularly preferably up to 40 mol. %, especially up to 30 mol. % (based on the sum of the moles of diphenols used) of at least one further diphenol selected from formula 4 or 5. The diphenols are known in the literature or may be prepared by processes known in the literature (see e.g. H. J. Buysch et al., Ullmann's Encyclopedia of Industrial Chemistry, VCH, New York 1991, 5th Ed., Vol. 19, p. 348).

Particular preference is given to polycarbonates that contain bisphenol A (BPA) and/or trimethylcyclohexylbisphenol (TMC) as diphenol units. Very particular preference is given to homopolycarbonates of BPA, or copolycarbonates of BPA and TMC with preferably from 5 to 60 wt. % TMC, based on the diphenols.

Suitable carbonic acid derivatives are, for example, phosgene or diphenyl carbonate.

Suitable chain terminators are both monophenols and monocarboxylic acids. Suitable monophenols are phenol itself, alkylphenols, such as cresols, p-tert.-butylphenol, p-n-octylphenol, p-isooctylphenol, p-n-nonylphenol and p-isononyl-phenol, p-cumylphenol, halophenols, such as p-chlorophenol, 2,4-dichlorophenol, p-bromophenol, amylphenol and 2,4,6-tribromophenol, and mixtures thereof.

Preferred chain terminators are the phenols of formula (I)

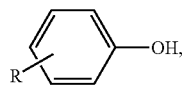

(I)

wherein R is hydrogen, tert.-butyl or a branched or unbranched $C_8$- and/or $C_9$-alkyl radical. However, p-cumylphenol may also preferably be used. In the case of the transesterification process, the chain terminator results from the diaryl carbonate used.

The amount of chain terminator to be used, preferably in the interfacial process, is from 0.1 mol. % to 5 mol. %, based on moles of diphenols used. The chain terminators may be added before, during or after the phosgenation.

Suitable branching agents are the compounds having a functionality of three or more that are known in polycarbonate chemistry, especially those having three or more phenolic OH groups.

Suitable branching agents are, for example, phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-(bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)-phenyl)-orthoterephthalic acid ester, tetra-(4-hydroxyphenyl)-methane, tetra-(4-(4-hydroxyphenyl-isopropyl)-phenoxy)-methane and 1,4-bis-(4',4"-dihydroxy-triphenyl)-methyl)-benzene, as well as 2,4-dihydroxybenzoic acid, trimesic acid, cyanuric chloride and even, for some applications, preferably 3,3-bis-(3-methyl-4-hydroxyphenyl)-2-oxo-2,3-dihydroindole.

The amount of the branching agent that is optionally to be used is from 0.01 mol. % to 2 mol. %, again based on moles of diphenols used in a particular case.

In the interfacial process, the branching agents may either be placed in a reaction vessel with the diphenols and the chain terminators in the aqueous alkaline phase or may be added in the form of a solution in an organic solvent. In the case of the transesterification process, the branching agents may be used together with the diphenols.

All these measures for the preparation of the thermoplastic polycarbonates are known to the person skilled in the art.

The compositions according to the invention may also contain additives conventional for polycarbonates in known amounts, such as, for example and preferably, stabilizers against UV radiation, flameproofing agents, colorings, fillers, foaming agents, optical brighteners and antistatics. In optical applications, those components that do not impair the transparency of the material are preferably employed.

These substances are to be found in many publications, for example in Additives for Plastics Handbook, John Murphy, 1999, and are available commercially.

1. Suitable Antioxidants are, for Example:

1.1. Alkylated monophenols for example 2,6-di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert.-butyl-4-methoxymethylphenol, nonylphenols that are linear or branched in the side chain, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol.

1.2. Alkylthiomethylphenols, for example 2,4-dioctylthiomethyl-6-tert.-butyl-phenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert.-butyl-4-methoxyphenol, 2,5-di-tert.-butylhydroquinone, 2,5-di-tert.-amylhydroquinone, 2,6-diphenyl-4-octadecyloxyphenol, 2,6-di-tert.-butylhydroquinone, 2,5-di-tert.-butyl-4-hydroxyanisole, 3,5-di-tert.-butyl-4-hydroxyanisole, 3,5-di-tert.-butyl-4-hydroxphenyl stearate, bis(3,5-di-tert.-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert.-butyl-4-methylphenol), 2,2'-thiobis(4-octylphenol), 4,4'-thiobis(6-tert.-butyl-3-methylphenol), 4,4'-thiobis(6-tert.-butyl-2-methylphenol), 4,4'-thiobis(3,6-di-sec.-amylphenol), 4,4'-bis(2,6-dimethyl-4-hydroxyphenyl) disulfide.

1.6. Alkylidenebisphenols, for example 2,2'-methylenebis (6-tert.-butyl-4-methylphenol), 2,2'-methylenebis(6-tert.-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert.-butylphenol), 2,2'-ethylidenebis(4,6-di-tert.-butylphenol), 2,2'-ethylidenebis(6-tert.-butyl-4-isobutylphenol), 2,2'-methylenebis[6-α-methylbenzyl)-4-nonylphenol], 2,2'-methylenebis[6-(α,α-dimethylbenzyl)-4-nonylphenol], 4,4'-methylenebis(2,6-di-tert.-butylphenol), 4,4'-methylenebis (6-tert.-butyl-2-methylphenol), 1,1-bis(5-tert.-butyl-4-hydroxy-2-methylphenyl)butane, 2,6-bis(3-tert.-butyl-5-methyl-2-hydroxybenzyl)-4-methylphenol, 1,1,3-tris(5-tert.-butyl-4-hydroxy-2-methylphenyl)butane, 1,1-bis(5-tert.-butyl-4-hydroxy-2-methylphenyl)-3-n-dodecylmercaptobutane, ethylene glycol bis[3,3-bis(3'-tert.-butyl-4'-hydroxyphenyl)butyrate], bis(3-tert.-butyl-4-hydroxy-5-methyl-phenyl)dicyclopentadiene, bis[2-(3'-tert.-butyl-2'-hydroxy-5'-methylbenzyl)-6-tert.-butyl-4-methylphenyl]terephthalate, 1,1-bis(3,5-dimethyl-2-hydroxyphenyl)butane, 2,2-bis(3,5-di-tert.-butyl-4-hydroxyphenyl)propane, 2,2-bis(5-tert.-butyl-4-hydroxy-2- methylphenyl)-4-n-dodecylmetcaptobutane, 1,1,5,5-tetra-(5-tert.-butyl-4-hydroxy-2-methylphenyl)pentane.

1.7. O-, N- and S-benzyl compounds, for example 3,5,3',5'-tetra-tert.-butyl-4,4'-dihydroxydibenzyl ether, octadecyl-4-hydroxy-3,5-dimethylbenzyl mercaptoacetate, tridecyl-4-hydroxy-3,5-di-tert.-butylbenzyl mercaptoacetate, tris(3,5-di-tert.-butyl-4-hydroxybenzyl)amine, bis(4-tert.-butyl-3-hydroxy-2,6-dimethylbenzyl) dithioterephthalate, bis(3,5-di-tert.-butyl-4-hydroxybenzyl) sulfide, isooctyl 3,5-di-tert.-butyl-4-hydroxybenzylmercaptoacetate.

1.8. Hydroxybenzylated malonates, for example dioctadecyl-2,2-bis(3,5-di-tert.-butyl-2-hydroxybenzyl) malonate, dioctadecyl-2-(3-tert.-butyl-4-hydroxy-5-methylbenzyl) malonate, didodecylmercaptoethyl-2,2-bis(3,5-di-tert.-butyl-4-hydroxybenzyl) malonate, bis[4-(1,1,3,3-tetramethylbutyl)phenyl]-2,2-bis(3,5-di-tert.-butyl-4-hydroxy-benzyl) malonate.

1.9. Aromatic hydroxybenzyl compounds, for example 1,3,5-tris(3,5-di-tert.-butyl-4-hydroxybenzyl)-2,4,6-trimethylbenzene, 1,4-bis(3,5-di-tert.-butyl-4-hydroxybenzyl)-2,3,5,6-tetramethylbenzene, 2,4,6-tris(3,5-di-tert.-butyl-4-hydroxybenzyl)phenol.

1.10. Triazine compounds, for example 2,4-bis(octylmercapto)-6-(3,5-di-tert.-butyl-4-hydroxyanilino)-1,3,5-triazine, 2-octylmercapto-4,6-bis(3,5-di-tert.-butyl-4-hydroxyanilino)-1,3,5-triazine, 2-octylmercapto-4,6-bis(3,5-di-tert.-butyl-4-hydroxyphenoxy)-1,3,5-triazine, 2,4,6-tris(3,5-di-tert.-butyl-4-hydroxyphenoxy)-1,2,3-triazine, 1,3,5-tris(3,5-di-tert.-butyl-4-hydroxybenzyl) isocyanurate, 1,3,5-tris(4-tert.-butyl-3-hydroxy-2,6-dimethylbenzyl) isocyanurate, 2,4,6-tris(3,5-di-tert.-butyl-4-hydroxyphenylethyl)-1,3,5-triazine, 1,3,5-tris(3,5-di-tert.-butyl-4-hydroxyphenylpropionyl)hexahydro-1,3,5-triazine, 1,3,5-tris(3,5-dicyclohexyl-4-hydroxybenzyl) isocyanurate.

1.11. Acylaminophenols, for example 4-hydroxylauranilide, 4-hydroxytearanilide, octyl-N-(3,5-di-tert.-butyl-4-hydroxyphenyl)carbamate.

1.12. Esters of β-(3,5-di-tert.-butyl-4-hydroxyphenyl)propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, the ester with octadecanol (IRGANOX 1076® from Ciba Spec.) being very particularly suitable and preferred.

1.13. Esters of β-(5-tert.-butyl-4-hydroxy-3-methylphenyl)propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(3,5-dicyclohexyl-4-hydroxyphenyl) propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert.-butyl-4-hydroxyphenylacetic acid with mono- or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert.-butyl-4-hydroxyphenyl) propionic acid, for example N,N'-bis(3,5-di-tert.-butyl-4-hydroxyphenylpropionyl)hexamethylenediamide, N,N'-bis(3,5-di-tert.-butyl-4-hydroxyphenylpropionyl) trimethylenediamide, N,N'-bis(3,5-di-tert.-butyl-4-hydroxyphenylpropionyl)hydrazide, N,N'-bis[2-(3-[3,5-di-tert.-butyl-4-hydroxyphenyl]-propionyloxy)ethyl]oxamide (Naugard® XL-1 from Uniroyal).

1.17. Ascorbic Acid (Vitamin C)

1.18. Amine-type antioxidants, for example N,N'-diisopropyl-p-phenylenediamine, N,N'-di-sec.-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec.-butyl-p-phenylenediamine, diphenylamine, N-allyldiphenylamine, 4-isopropoxy-diphenylamine, N-phenyl-1-naphthylamine, N-(4-tert.-octylphenyl)-1-naphthylamine, N-phenyl-2-naphthylamine, octylated diphenylamine, for example p,p'-di-tert.-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert.-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert.-octylated N-phenyl-1-naphthylamine, a mixture of mono- and di-alkylated tert.-butyl-/tert.-octyl-diphenylamines, a mixture of mono- and di-alkylated nonyldiphenylamines, a mixture of mono- and di-alkylated dodecyldiphenylamines, a mixture of mono- and di-alkylated isopropyl-/isohexyl-diphenylamines, a mixture of mono- and di-alkylated tert.-butyldiphenylamines, 2,3-dihydro-3,3-dimethyl-4H-1,4-benzothiazine, phenothiazine, a mixture of mono- and di-alkylated tert.-butyl-/tert.-octyl-phenothiazines, a mixture of mono- and di-alkylated tert.-octylphenothiazines, N-allylphenothiazine, N,N,N,'N'-tetraphenyl-1,4-diaminobut-2-ene, N,N-bis(2,2,6,6-tetramethylpiperid-4-yl)hexamethylenediamine, bis(2,2,6,6-tetramethylpiperid-4-yl) sebacate, 2,2,6,6-tetramethylpiperidin-4-one, 2,2,6,6-tetramethylpiperidin-4-ol. Such compounds may be used individually or in the form of mixtures.

1.19. Suitable thiosynergists are, for example, dilaurylthiodipropionate and/or distearylthiodipropionate.

2. UV absorbers and light stabilizers may be used in the compositions according to the invention in amounts of from 0.1 to 15 wt. %, preferably from 3 to 8 wt. %, based on the weight of the composition. Suitable UV absorbers and light stabilizers are, for example:

2.1. 2-(2'-Hydroxyphenyl)benzotriazoles, for example 2-(2'-hydroxy-5'-methylphenyl)benzotriazole, 2-(3',5'-di-tert.-butyl-2'-hydroxyphenyl)benzotriazole, 2-(5'-tert.-butyl-2'-hydroxyphenyl)benzotriazole, 2-(2'-hydroxy-5'-(1,1,3,3-tetramethylbutyl)phenyl) benzotriazole, 2-(3',5'-di-tert.-butyl-2'-hydroxyphenyl)-5-chlorobenzotriazole, 2-(3'-tert.-butyl-2'-hydroxy-5'-methylphenyl)-5-chlorobenzotriazole, 2-(3'-sec.-butyl-5'-tert.-butyl-2'-hydroxyphenyl)benzotriazole, 2-(2'-hydroxy-4'-octyloxyphenyl)benzotriazole, 2-(3',5'-di-tert.-amyl-2'-hydroxyphenyl)benzotriazole, 2-(3',5'-bis (α,α-dimethylbenzyl)-2'-hydroxyphenyl)benzotriazole, 2-(3'-tert.-butyl-2'-hydroxy-5'-(2-octyloxycarbonylethyl) phenyl)-5-chlorobenzotriazole, 2-(3'-tert.-butyl-5'-[2-(2-ethylhexyloxy)carbonylethyl]-2'-hydroxyphenyl)-5-chlorobenzotriazole, 2-(3'-tert.-butyl-2'-hydroxy-5'-(2-methoxycarbonylethyl)phenyl)-5-chlorobenzotriazole, 2-(3'-tert.-butyl-2'-hydroxy-5'-(2-methoxycarbonylethyl) phenyl)benzotriazole, 2-(3'-tert.-butyl-2'-hydroxy-5'-(2-octyloxycarbonylethyl)phenyl)benzotriazole, 2-(3'-tert.-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert.-butyl-2'-hydroxy-5'-(2-isooctyloxycarbonylethyl)phenyl)benzotriazole, 2,2'-methylene-bis[4-(1,1,3,3-tetramethylbutyl)-6-benzotriazol-2-ylphenol]; the transesterification product of 2-[3'-tert.-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$, wherein R=3'-tert.-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, such as, for example, 4-tert.-butylphenyl salicylate, phenyl salicylate, octylphenyl salicylate, dibenzoylresorcinol, bis (4-tert.-butylbenzoyl)resorcinol, benzoylresorcinol, 2,4-di-tert.-butylphenyl-3,5-di-tert.-butyl 4-hydroxybenzoate, hexadecyl-3,5-di-tert.-butyl 4-hydroxybenzoate, octadecyl-3,5-di-tert.-butyl 4-hydroxybenzoate, 2-methyl-4,6-di-tert.-butylphenyl-3,5-di-tert.-butyl 4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N—(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands, such as n-butylamine, triethanolamine or N-cyclohexyldiethanolamine, nickel dibutyldithiocarbamate, nickel salts of the monoalkyl esters, for example of the methyl or ethyl ester, of 4-hydroxy-3,5-di-tert.-butylbenzylphosphonic acid, nickel complexes of ketoximes, for example of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl), n-butyl-3,5-di-tert.-butyl 4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl) hexamethylenediamine and 4-tert.-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis (1,2,2,6,6-pentamethylpiperidyl)-2-n-butyl-2-(2-hydroxy-3,5-di-tert.-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, linear or cyclic condensation products of N,N'-bis(2,2,6,6-tetramethyl-4-piperidyl)hexamethylenediamine and 4-morpholino-2,6-dichloro-1,3,5-triazine, the condensation product of 2-chloro-4,6-bis(4-n-butylamino-2,2,6,6-tetramethylpiperidyl)-1,3,5-triazine and 1,2-bis(3-aminopropylamino)ethane, the condensation product of 2-chloro-4,6-bis(4-n-butylamino-1,2,2,6,6-pentamethylpiperidyl)-1,3,5-triazine and 1,2-bis(3-aminopropylamino) ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro [4.5]decane, a reaction product of 7,7,9,9-tetramethyl-2-cycloundecyl-1-oxa-3,8-diaza-4-oxospiro[4.5]-decane and epichlorohydrin, 1,1-bis(1,2,2,6,6-pentamethyl-4-piperidyloxycarbonyl)-2-(4-methoxyphenyl)ethene, N,N'-bis (formyl)-N,N'-bis(2,2,6,6-tetramethyl-4-piperidyl)hexamethylenediamine, diester of 4-methoxymethylenemalonic acid with 1,2,2,6,6-pentamethyl-4-hydroxypiperidine, poly [methylpropyl-3-oxy-4-(2,2,6,6-tetramethyl-4-piperidyl)]siloxane, reaction product of maleic anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert.-butoxanilide, 2,2'-didodecyloxy-5,5'-di-tert.-butoxanilide, 2-ethoxy-2'-ethyloxanilide, N,N'-bis(3-diniethylaminopropyl)oxamide, 2-ethoxy-5-tert.-butyl-2'-ethoxanilide and the mixture thereof with 2-ethoxy-2'-ethyl-5,4'-di-tert.-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-

1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

Such compounds may be used individually or in the form of mixtures.

3. Suitable metal deactivators are, for example, N,N'-diphenyloxamide, N-salicylal-N'-salicyloylhydrazine, N,N'-bis(salicyloyl)hydrazine, N,N'-bis(3,5-di-tert.-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoylbisphenyl hydrazide, N,N'-diacetyladipoyl dihydrazide, N,N'-bis(salicyloyl)oxalyl dihydrazide, N,N'-bis(salicyloyl)thiopropionyl dihydrazide. Such compounds may be used individually or in the form of mixtures.

4. Suitable peroxide catchers are, for example, esters of p-thiodipropionic acid, for example the lauryl, stearyl, myristyl or tridecyl ester, mercaptobenzimidazole or the zinc salt of 2-mercaptobenzimidazole, zinc dibutyldithiocarbamate, dioctadecyl disulfide, pentaerythritol tetrakis(dodecylmercapto)propionate. Such compounds may be used individually or in the form of mixtures.

5. Suitable basic co-stabilizers are, for example, melamine, polyvinylpyrrolidone, dicyanodiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate. Such compounds may be used individually or in the form of mixtures.

6. Suitable nucleating agents are, for example, inorganic substances, such as talc, metallic oxides, such as titanium dioxide or magnesium oxide, phosphates, carbonates or sulfates, preferably of alkaline earth metals; organic compounds, such as mono- or poly-carboxylic acids and their salts, for example 4-tert.-butylbenzoic acid, adipic acid, diphenylacetic acid, sodium succinate or sodium benzoate; polymeric compounds, such as ionic copolymers (ionomers). Particular preference is given to 1,3:2,4-bis(3',4'-dimethylbenzylidene)sorbitol, 1,3:2,4-di(paramethyldibenzylidene)sorbitol and 1,3:2,4-di(benzylidene)sorbitol. Such compounds may be used individually or in the form of mixtures.

7. Suitable fillers and reinforcing agents are, for example, calcium carbonate, silicates, glass fibers, glass spheres, asbestos, talc, kaolin, mica, barium sulfate, metallic oxides and hydroxides, carbon black, graphite, wollastonite, wood flour and flours or fibers of other natural products, synthetic fibers. Such compounds may be used individually or in the form of mixtures.

8. Other suitable additives are, for example, plasticisers, lubricants, emulsifiers, pigments, viscosity-modifying agents, catalysts, flow agents, optical brighteners, flame-proofing agents, antistatic agents and blowing agents.

9. Suitable benzofuranones and indolinones are, for example, those which are disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-tert.-butyl-benzofuran-2-one, 5,7-di-tert.-butyl-3-[4-(2-stearoyl-oxyethoxy)phenyl]benzofuran-2-one, 3,3'-bis[5,7-di-tert.-butyl-3-(4-[2-hydroxyethoxy]phenyl)benzofuran-2-one], 5,7-di-tert.-butyl-3-(4-ethoxyphenyl)benzofuran-2-one, 3-(4-acetoxy-3,5-dimethylphenyl)-5,7-di-tert.-butyl-benzofuran-2-one, 3-(3,5-dimethyl-4-pivaloyloxyphenyl)-5,7-di-tert.-butylbenzofuran-2-one, 3-(3,4-dimethylphenyl)-5,7-di-tert.-butylbenzofuran-2-one, 3-(2,3-dimethylphenyl)-5,7-di-tert.-butylbenzofuran-2-one, lactone antioxidants such as

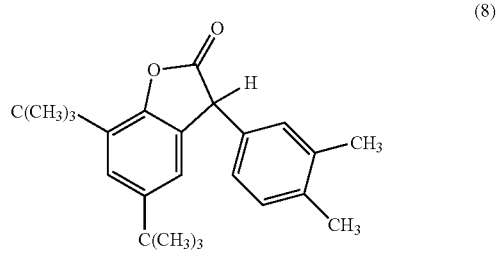

(8)

Such compounds act, for example, as antioxidants. Such compounds may be used individually or in the form of mixtures.

10. Suitable fluorescing plasticisers are those listed in "Plastics Additives Handbook", eds. R. Gächter and H. Müller, Hanser Verlag, 3rd Edition, 1990, pages 775-789.

11. Suitable flame-retardant additives are phosphate esters, i.e. triphenyl phosphate, resorcinoldiphosphoric acid esters, bromine-containing compounds, such as brominated phosphoric acid esters, brominated oligocarbonates and polycarbonates, as well as salts, such as $C_4F_9SO_3^-Na^+$.

12. Suitable agents imparting impact resistance are butadiene rubber with styrene-acrylonitrile or methyl methacrylate grafted thereon, ethylene-propylene rubbers with maleic anhydride grafted thereon, ethyl- and butyl-acrylate rubbers with methyl methacrylate or styrene acrylonitrile grafted thereon, interpenetrating siloxane and acrylate networks with methyl methacrylate or styrene-acrylonitrile grafted thereon.

13. Suitable polymers are SAN, ABS, PMMA, PTFE, PSU, PPS, polyolefins, such as polyethylene, polypropylene and ethylene-propylene rubbers, epoxy resins, polyesters, such as PBT, PET, PCT, PCTG and PETG, as well as other polycarbonates produced by the interfacial process.

14. Suitable antistatic agents are sulfonate salts, for example tetraethylammonium salts of $C_{12}H_{25}SO^{3-}$ or $C_8F_{17}SO^{3-}$.

15. Suitable coloring agents are pigments as well as organic and inorganic colorants.

16. Compounds containing epoxy groups, such as 3,4-epoxycyclohexylmethyl-3,4-epoxycyclohexyl carboxylate, copolymers of glycidyl methacrylate and epoxysilanes.

17. Compounds containing anhydride groups, such as maleic anhydride, succinic anhydride, benzoic anhydride and phthalic anhydride.

18. Phosphites and phosphonites suitable as stabilizers are, for example, triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert.-butylphenyl) phosphite, diisodecylpentaerythritol diphosphite, bis(2,4-di-tert.-butylphenyl)pentaerythritol diphosphite, bis(2,6-di-tert.-butyl-4-methylphenyl)pentaerythritol diphosphite, diisodecyloxypentaerythritol diphosphite, bis(2,4-di-tert.-butyl-6-methylphenyl)-pentaerythritol diphosphite, bis(2,4,6-tris(tert.-butylphenyl)pentaerythritol diphosphite, tristearylsorbitol triphosphite, tetrakis(2,4-di-tert.-butylphenyl)-4,4'-biphenylene diphosphonite, 6-isooctyloxy-2,4,8,10-tetra-tert.-butyl-12H-dibenz[d,g]-1,3,2-dioxaphosphocine, 6-fluoro-2,4,8,10-tetra-tert.-butyl-12-methyl-dibenz[d,g]-1,3,2-dioxaphosphocine, bis(2,4-di-tert.-butyl-6-methylphenyl)methyl phosphite, bis(2,4-di-tert.-butyl-6-methylphenyl)ethyl phosphite, 6-fluoro-2,4,8,10-tetra-tert.-butyl-12-methyldibenz[d,g]-1,3,2-dioxaphosphocine, 2,2',2"-nitrilo-[triethyltris(3,3',5,5'-tetra-tert.-butyl-1,1'-biphenyl-2,2'-diyl) phosphite], 2-ethylhexyl(3,3',5,5'-tetra-tert.-butyl-1,1'-biphenyl-2,2'-diyl) phosphite, 5-butyl-5-ethyl-2-(2,4,6-tri-tert.-butylphenoxy)-1,3,2-dioxaphosphirane. Such compounds may be used individually or in the form of mixtures.

Particular preference is given to tris(2,4-di-tert.-butylphenyl) phosphite (Irgafos® 168, Ciba-Geigy), or triphenylphosphine.

The compounds of groups 16 and 17 act as melt stabilizers. They may be used individually or in the form of mixtures.

As mold release agents there are preferably used esters of mono- or poly-hydric alcohols with long-chain carboxylic acids, such as Loxiol G32 or Loxiol G33. Preference is given also to those mold release agents that have not been completely esterified and accordingly contain free OH groups. Particular preference is given to (partial) esters of saturated monovalent fatty acids having from 16 to 22 carbon atoms with glycerol, trimethylolpropane, pentaerythritol or similar polyhydric alcohols, especially glycerol monostearate (GMS) and glycerol monopalmitate. Pentaerythritol tetrastearate (PETS) is also preferred.

Such saturated monovalent fatty acid esters of glycerol are used on their own or in the form of mixtures with two or more components. The saturated monoesters of glycerol are usually prepared by transesterification of hydrogenated animal or vegetable oil with glycerol. Although the reaction product may contain other esters than the glycerol ester, it is used as mold release agent. For example, the mixture may contain small or larger amounts of diglycerides and triglycerides.

The optimum amount of mold release agent in the production of CDs and other optical storage media (DVDs, etc.) is determined on the one hand by an adequate mold-release action and on the other hand by coating formation on the tool. Concentrations that are usually employed are from 50 to 1000 ppm, more advantageously from 100 to 500 ppm of mold release agent. For the other applications of polycarbonate, the concentrations are from 100 to 10,000 ppm, preferably from 2000 to 7000 ppm.

As heat stabilizers there are used, for example, without implying any limitation, specific phosphites which possess both aromatic and aliphatic radicals in a molecule. They are compounds having the following structure:

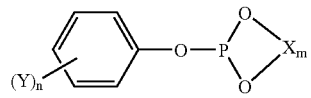

wherein n represents a number from 0 to 5, preferably from 1 to 3 and very particularly preferably 3, each Y independently of any other(s) represents alkyl or optionally substituted aryl, preferably $C_1$-$C_4$-alkyl, particularly preferably methyl, sec.-butyl and tert.-butyl, m represents a number from 1 to 3, preferably 3, and each X independently of any other(s) represents an optionally substituted methylene radical, wherein at least one methylene radical must be completely substituted and the substituents are selected independently of one another from the group $C_1$-$C_{20}$-alkyl, or alternatively the two substituents on a completely substituted methylene radical together represent a radical

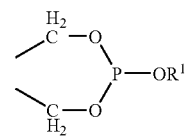

wherein $R^1$ is selected from the group $C_1$-$C_{18}$-alkyl, $C_3$-$C_{12}$-cycloalkyl, $C_6$-$C_{30}$-alkaryl and aryl, wherein these radicals may in turn be substituted by from 1 to 4 O-alkylene-O and/or carboxylic acid ester COO radicals; $C_2$-$C_{18}$-polyhydroxyalkyl having from 2 to 10 hydroxyl groups; $C_2$-$C_{18}$-polyphenyl radicals having from 2 to 10 phenolic OH groups.

Preference is given to compounds of formula

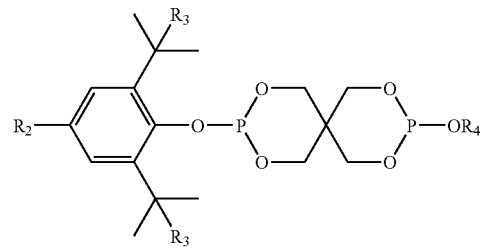

wherein $R^2$ represents $C_1$-$C_6$-alkyl;

$R^3$ represents methyl or ethyl and $R^4$ is selected from the group $C_1$-$C_{18}$-alkyl, $C_3$-$C_{12}$-cycloalkyl, $C_6$-$C_{30}$-alkaryl and aryl, wherein these radicals may in turn be substituted by from 1 to 4 O-alkylene-O and/or carboxylic acid ester COO radicals; $C_2$-$C_{18}$-polyhydroxyalkyl having from 2 to 10 hydroxyl groups; $C_2$-$C_{18}$-polyphenyl radicals having from 2 to 10 phenolic OH groups.

Preference is given also to compounds of formula

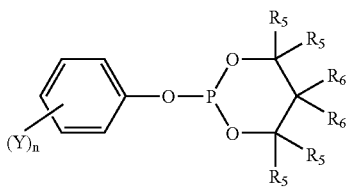

wherein Y and n have the meanings given above and
each $R^5$ is selected independently of the others from the group hydrogen and $C_3$-$C_{20}$-alkyl, preferably at least one $R^5$ representing alkyl,
each $R^6$ independently of the other represents $C_1$-$C_{10}$-alkyl.

Particular preference is given to compounds of formula

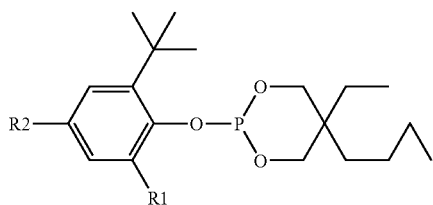

wherein $R^1$ and $R^2$ represent methyl, sec.-butyl or tert.-butyl.

Particular preference is additionally given also to the compounds defined on p. 16-20 of EP A1 0 038 876 and the example mentioned on page 21 of the same specification.

Very particular preference is given to (2,4,6-tri-t-butylphenyl)-(2-butyl-2-ethylpropane-1,3-diyl)-phosphite, which has the following structure:

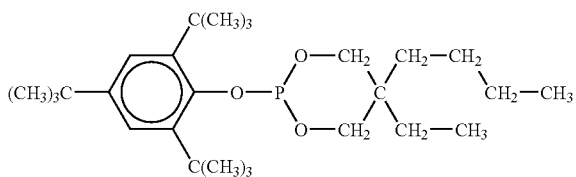

The phosphites may be used alone or in combination with other phosphorus compounds, it being possible for the other phosphorus compounds also to be those that have a different oxidation number of the phosphorus. Accordingly, for example, combinations of the phosphites according to the invention with other phosphites, with phosphines, e.g. triphenylphosphine, with phosphonites, with phosphates, with phosphonates, etc. may be used.

The phosphites used are generally known or may be prepared analogously to known phosphites, (2,4,6-tri-t-butylphenyl)-(2-butyl-2-ethyl-propane-1,3-diyl)-phosphite is described, for example, in EP-A 702018 and EP 635514.

The polymer mixtures according to the invention contain the phosphorus compound generally in an amount of from 10 to 5000 ppm, preferably from 10 to 1000 ppm, particularly preferably from 20 to 500 ppm, very particularly preferably from 50 to 250 ppm.

The addition of the mold release agents, the phosphorus compound and the formals according to the invention to the thermoplastic molding compositions is carried out, for example and preferably, by metering them in after the preparation and during the working-up of the polycarbonates, e.g. by addition to the polycarbonate-polymer solution, or to a melt of the thermoplastic molding compositions. It is also possible to meter the components in independently of one another in different working steps, e.g. one of the components during working-up of the polymer solution and the other component(s) in the melt, provided that it is ensured that all the components are present during production of the end products (molded articles).

For applications in the field of CDs, DVDs and other optical recording media, the person skilled in the art will, of course, select from the above-mentioned additives those additives that do not impair the transparency.

Very particularly suitable additives are IRGANOX 1076®, see above, and benzotriazoles of group 2.1 (so-called Tinuvins), especially in a mixture with one another, as well as triphenylphosphine (TPP).

The molding compositions according to the invention are used in the manner known for polycarbonates in the production of molded articles, preferably optical media, in particular in the production of Compact Disks and DVDs and of optical media that are writable and erasable once or repeatedly. The writable layers therein consist especially of colorings or metal layers, the latter using as the recording principle the change from the amorphous to the crystalline state or having magnetic properties.

The optical media are preferably produced from the finished molding compositions according to the invention, which are obtained, for example, in the form of granules. However, the optical media may also be produced by incorporating the components into polycarbonates and/or into the additives conventional in the production of molded articles from polycarbonates.

Accordingly, the invention further provides molded articles, such as especially optical data carriers, preferably Compact Disks and DVDs, obtainable from the thermoplastic molding compositions according to the invention.

The thermoplastic molding compositions according to the invention have the advantage that they exhibit lower water absorption and accordingly improved dimensional stability. They are additionally distinguished by improved flow behaviour because they have a lower melt viscosity.

The Examples which follow serve to illustrate the invention. The invention is not limited to the Examples.

EXAMPLES

Example A

Synthesis of the Copolyformal from Bisphenol TMC and Bisphenol A

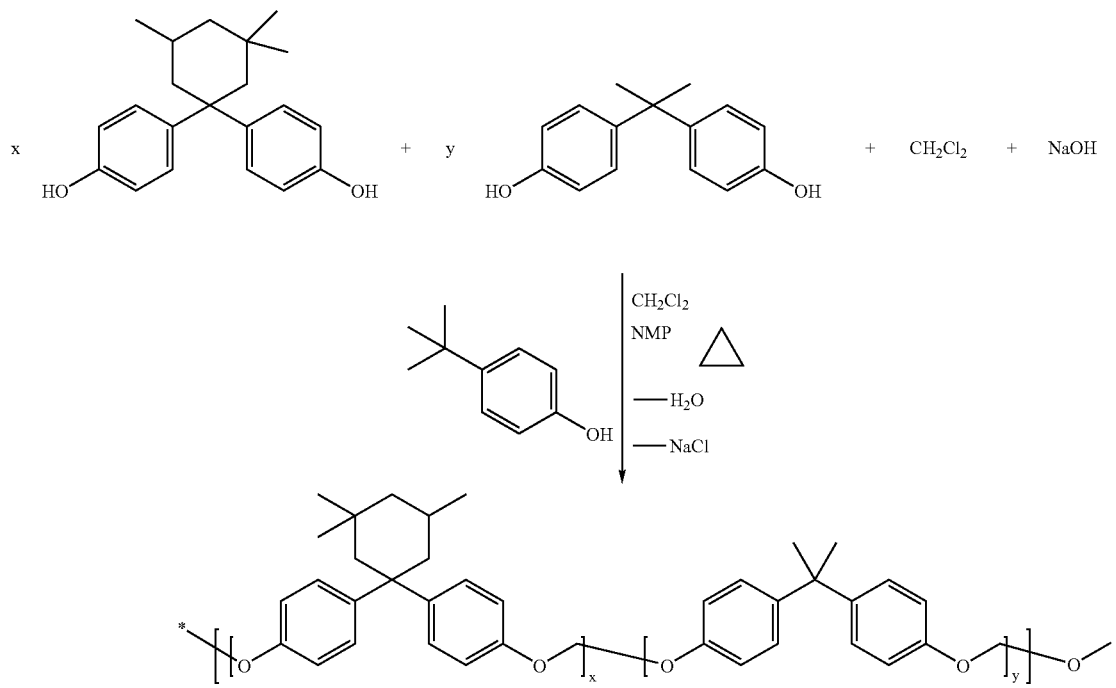

5.432 kg (17.5 mol.) of bisphenol TMC (x=70 mol. %), 1.712 kg (7.5 mol.) of bisphenol A (y=30 mol. %), 2.5 kg (62.5 mol.) of sodium hydroxide pieces and 56.33 g (0.375 mol.) of finely ground p-tert.-butylphenol (Aldrich) in 500 ml of methylene chloride are added, with stirring and under nitrogen protecting gas, to a solvent mixture of 28.7 kg of methylene chloride and 40.18 kg of N-methyl-2-pyrrolidone (NMP). After homogenisation, the mixture is heated to reflux (78° C.) and stirred at that temperature for one hour. After cooling to 25° C., the reaction batch is diluted with 35 liters of methylene chloride and 20 liters of demineralised water. In a separator, the batch is washed with water until neutral and free of salt (conductivity <15 µS.cm$^{-1}$). The organic phase from the separator is separated off and, in an evaporating vessel, the solvent methylene chloride is exchanged for chlorobenzene. Extrusion of the material is then carried out by means of a ZSK 32 evaporating extruder at a temperature of 280° C. with subsequent granulation. After discarding preliminary material, a total of 5.14 kg of copolyformal is obtained in the form of transparent granules. These still contain low molecular weight cyclic compounds as impurity. The material is swelled overnight with about 5 liters of acetone. The resulting composition is kneaded with several portions of fresh acetone until no further cyclic compounds is detected by the Maldi-Tof method. The purified material is dissolved in chlorobenzene and again extruded through the evaporating extruder at 270° C. After discarding preliminary material, 3.11 kg of polyformal are obtained in the form of transparent granules.

Analysis:
molecular weight Mw=39,901, Mn=19,538, D=2.04 by GPC (calibration against polycarbonate)
glass transition temperature Tg=148° C.
relative solution viscosity in methylene chloride (0.5 g/100 ml solution)=1.246
$^1$H=NMR in CDCl$_3$ shows the expected ratio of incorporation x/y

Example B

Compounds of Polycarbonate and Polyformal

The compounds listed in Table 1 are prepared as follows:
The polycarbonate (CD2005, BPA polycarbonate from Bayer MaterialScience AG, MVR 60 ml/10 min) and the polyformal from Example A are weighed out in the amounts indicated in Table 1 and dissolved in about 100 ml of methylene chloride. The homogeneous solution so obtained is then concentrated to dryness by evaporation overnight in a vacuum drying cabinet at 80° C., and the residue is ground. The solids are compounded in a DSM mini injection-molding machine at a temperature of 250° C. and with a residence time of 3 minutes.

The water absorption of the resulting products is determined after storage in a moist environment at 95% relative humidity and a storage temperature of 30° C. The values obtained after 7 and 14 days' storage are shown in Table 1.

TABLE 1

| Ex. | Polycarbonate (weighed amount in g) | Polyformal A (weighed amount in g) (or %) | Water absorption (%) 7 days | Water absorption (%) 14 days |
|---|---|---|---|---|
| 1 | 15.0 | — | 0.32 | 0.33 |
| 2 | 14.25 | 0.75 (5%) | 0.26 | 0.29 |
| 3 | 13.50 | 1.50 (10%) | 0.22 | 0.27 |
| 4 | 11.25 | 3.75 (25%) | 0.21 | 0.23 |

It will be seen that the compounds according to the invention of Examples 2 to 4 have a markedly lower water absorption than the pure polycarbonate according to Comparison Example 1.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising polycarbonate and polyformal, said polyformal including repeating structural unit conforming to formula (1)

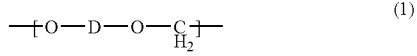

(1)

wherein
D represents an aromatic radical having 6 to 40 carbon atoms, said radical optionally containing hetero atoms, and is optionally substituted by $C_1$-$C_{12}$-alkyl, and/or by halogen, and is further optionally containing aliphatic or cycloaliphatic radicals.

2. The composition of claim 1 wherein said aromatic radical contains one or more condensed aromatic nuclei.

3. The composition of claim 1 wherein said aromatic radical contains hetero atoms.

4. The composition of claim 1 wherein said aromatic radical is substituted by at least one member selected from the group consisting of $C_1$-$C_{12}$-alkyl and halogens.

5. The composition of claim 1 wherein said aromatic radical contains aliphatic or cycloaliphatic radicals, aromatic nuclei or hetero atoms as bridge members.

6. The composition of claim 1 wherein said D conforms to formula (1a)

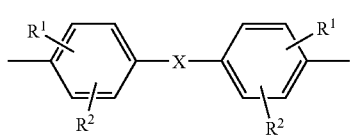

(1a)

wherein
$R^1$ and $R^2$ independently of one another represent H, $C_1$-$C_{18}$-alkyl, $C_1$-$C_{18}$-alkoxy, halogen, aryl or aralkyl, and
X represents a single bond, —$SO_2$—, —CO—, —O—, —S—, $C_1$-$C_6$-alkylene, $C_2$-$C_5$-alkylidene, $C_5$-$C_6$-cycloalkylidene, or $C_6$- to $C_{12}$-arylene.

7. The composition of claim 6 wherein said aryl and/or aralkyl are substituted.

8. The composition of claim 6 wherein said cycloalkylidene is substituted by $C_1$- to $C_6$-alkyl.

9. The composition of claim 6 wherein said arylene is condensed with further aromatic rings containing at least one hetero atom.

10. The composition according to claim 6, wherein D is derived from a member selected from the group consisting of 2,2-bis-(4-hydroxyphenyl)-propane, 4,4-dihydroxybiphenyl, 1,3-bis[2-(4-hydroxyphenyl)-2-propyl]-benzene and 1,1-bis-(4-hydroxyphenyl)-3,3,5-trimethylcyclohexane.

11. The composition according to claim 1 further comprising a mold release agent.

12. The composition according to claim 11 wherein agent is an ester of polyhydric alcohols with long-chain carboxylic acids, the esters containing at least one free OH group.

13. The composition according to claim 1 wherein the polycarbonate has a weight average molecular weight of from 15,000 to 35,000.

14. The composition according to claim 1 wherein the polyformal is present in an amount of from 0.1 to 30% (based on the total weight of polycarbonate and polyformal).

15. The composition of claim 11 wherein mold release agent is present in an amount of 0.01 to 1.5% relative to the weight of the composition.

16. A molded article comprising the composition according to claim 1.

17. An optical data carrier comprising the composition of claim 1.

* * * * *